United States Patent
Coutu et al.

(10) Patent No.: US 6,867,566 B2
(45) Date of Patent: Mar. 15, 2005

(54) METHOD AND APPARATUS FOR IMPROVED LOW CURRENT ACCURACY IN MULTI-PHASE STEP MOTORS

(75) Inventors: David Coutu, East Hampton, CT (US); Robert A. Fournier, Newington, CT (US)

(73) Assignee: IMS Inc., Marlborough, CT (US)

( * ) Notice: Subject to any disclaimer, the term of this patent is extended or adjusted under 35 U.S.C. 154(b) by 0 days.

(21) Appl. No.: 10/641,849
(22) Filed: Aug. 15, 2003
(65) Prior Publication Data
US 2005/0035736 A1 Feb. 17, 2005

(51) Int. Cl.[7] .......................... H02P 8/00; G05B 19/40
(52) U.S. Cl. ........................................ 318/696; 318/685
(58) Field of Search ................................ 318/696, 685, 318/138, 254, 434; 388/907.2, 920, 916, 804, 811, 819

(56) References Cited

U.S. PATENT DOCUMENTS

| 5,003,261 A | * | 3/1991 | Kim ...................... 324/207.25 |
| 5,264,770 A | * | 11/1993 | Coutu ......................... 318/696 |
| 5,343,382 A | * | 8/1994 | Hale et al. ..................... 363/98 |
| 5,397,972 A | * | 3/1995 | Maiocchi ..................... 318/439 |
| 5,650,705 A | * | 7/1997 | Hart ............................ 318/635 |
| 5,886,484 A | * | 3/1999 | Fucili et al. ................. 318/254 |
| 5,949,203 A | * | 9/1999 | Buthker ....................... 318/254 |
| 6,049,184 A | * | 4/2000 | Uggla et al. ................. 318/434 |
| 6,057,663 A | * | 5/2000 | Galbiati et al. ............. 318/599 |
| 6,384,556 B1 | * | 5/2002 | Mizumoto et al. .......... 318/293 |
| 6,556,778 B2 | * | 4/2003 | Zhang et al. ............... 388/806 |

* cited by examiner

Primary Examiner—David Martin
Assistant Examiner—Patrick Miller

(57) ABSTRACT

The sense signal, which is used to indicate that the motor phase current in a stepper motor is at the set point, is marked both before and after each pulse width modulator edge thereby reducing susceptibility to commutation noise from any phase. A mask time is created for a period before and after a PWM edge. The phase current is balanced during this mask time by removing and replacing the phase current.

3 Claims, 1 Drawing Sheet

METHOD AND APPARATUS FOR IMPROVED LOW CURRENT ACCURACY IN MULTI-PHASE STEP MOTORS

BACKGROUND OF THE INVENTION

The phase current in each phase of a multi-phase step motor must be carefully controlled to insure precise motor rotation and to hold the motor in a fixed position upon stoppage. Methods for such motor control usually include a simple comparator and a set point for determining when the motor phase current is at or above the set point.

However, at low motor currents, commutation transients can cause the comparator to prematurely indicate that the set current has been reached and audible noise is often generated due to the uncertainty of the comparator switch point.

U.S. Pat. No. 5,650,705 entitled "Apparatus and Method for Controlling Currents in an Inductor", U.S. Pat. No. 5,264,770 entitled "Stepper Motor Driver Circuit" and U.S. Pat. No. 6,049,184 entitled "Method and Arrangement for Controlling A Current" each describe various methods for accurately controlling current in stepper motor applications.

One method used to eliminate the noise effects during switching transients consists of blocking or "masking" the sense signal during the transient. When at low current settings, simply masking the sense signal can cause errors if the motor current increases above the set point during the mask period, as a result, the phase current can be, on average, too high. Not masking commutation transients can cause the phase current to be shut off before the set point is reached; as a result, the phase current can be, on average, too low. Further, audible noise is often generated due to the uncertainty of the switch point.

One example of a mask control signal used in controlling a stepper motor is described within U.S. Pat. No. 5,003,261 entitled "Rotation Detection Circuit Having Input Pulse Signals for a Step Motor".

One purpose of the present invention is to improve stepper motor accuracy at low phase current values.

SUMMARY OF THE INVENTION

The sense signal, which is used to indicate that the motor phase current in a stepper motor is at the set point, is masked both before and after each pulse width modulator edge thereby reducing susceptibility to commutation noise from any phase. While the sense signal is masked, current is removed during the portion of the mask period before the PWM_OSC edge, and then an equal amount is put in during the mask period after the PWM_OSC edge. The removal and replacement keeps the current balanced during the commutation transient period allowing the accurate replacement of the normally occurring losses.

DESCRIPTION OF THE PREFERRED EMBODIMENT

Figure 1:
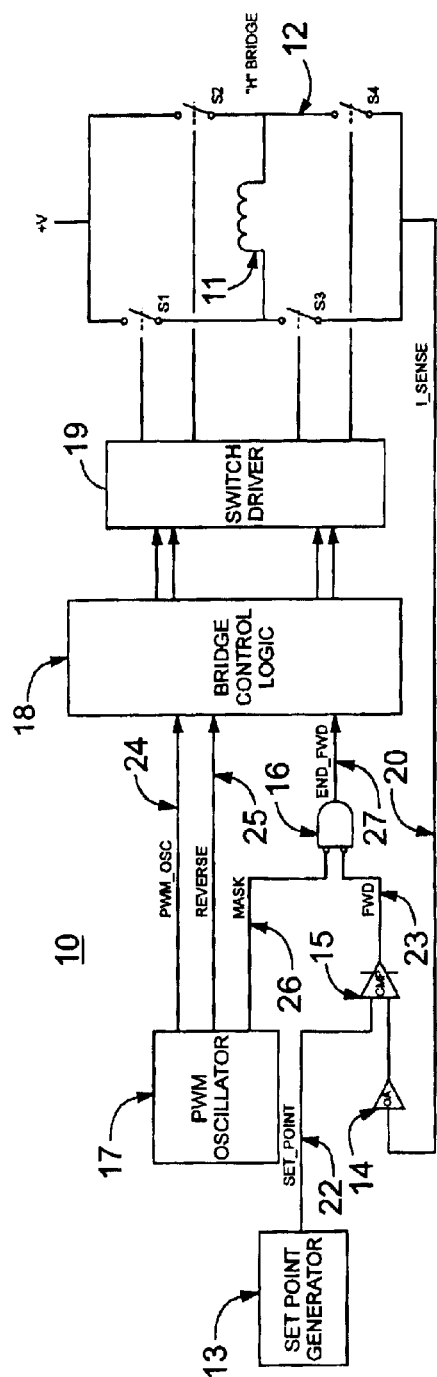
FIG. 1 is a schematic representation of the step motor control circuit according to the invention.

The step motor control circuit shown in FIG. 1 is similar to that described within U.S. Patent Application Ser. No. 10/628,122 entitled: "A Method for Independently Controlling Each Phase of a Multi-phase Step Motor" wherein each of phase of the multi-phase motor is separately controlled. As shown in FIG. 1, one motor phase coil 11 of a multiphase motor (not shown) is interconnected with the driver circuit 10 by means of an H bridge switch arrangement, hereafter "H bridge" 12 consisting of switches S1–S4, similar to that shown in the aforementioned U.S. Pat. No. 6,049,184 for individual control of each separate motor phase. Although only one motor phase coil 11 is depicted, it is understood that the driver circuit 10 connects in a similar manner with the other motor phase coils (not shown).

By activating the appropriate switches S1–S4 current can be directed through the phase coil 11 in different directions. In accordance with the teachings of the present invention, forward current, "FWD" is defined herein as increasing current away from zero. Reverse current, "REV" is defined as decreasing current toward zero. To achieve "FWD current or "REV" current one switch in the upper portion and one switch in the lower portion of the "H" bridge are activated. Recirculating current, RECIRC is defined as allowing current to move within the upper or lower portion of the H bridge 12 when FWD or REV current has been terminated. To achieve RECIRC current both switches S3, S4 in the lower portion or both switches S1, S2 in the upper portion of the "H" bridge 12 are activated. Phase current is sensed during FWD current across a resistor R1 creating a signal I_SENSE on conductor 20. The I_SENSE signal is conditioned by the signal conditioning OP AMP 14 then compared with the SET_POINT signal on conductor 22 created by SET POINT generator 13 using the comparator 15. The comparator 15 creates the FWD signal on conductor 23, which indicates that the FWD current as indicated by the I_SENSE signal is at or above the SET_POINT during the forward condition. The PWM oscillator 17 creates a PWM_OSC signal on conductor 24 and REVERSE, hereafter "REV" signal on conductor 25 which direct the bridge control logic 18 to activate the appropriate switches S1–S4 in the "H" bridge 12. The PWM oscillator 17 further creates the MASK signal on conductor 26 which, when present, prevents the FWD signal from connecting with the bridge control logic 18. The logic gate 16 with inputs FWD and MASK, as described earlier, creates the signal END_FWD on conductor 27 which, when present, directs the bridge control logic 18 to stop the forward condition allowing the phase current to recirculate. The remaining motor phases are controlled in a similar manner.

Figure 2:
FIG. 2 is a diagrammatic representation of the signal waveforms used within the circuit of FIG. 1.

For a clearer understanding of the invention, it is helpful to refer now to the signal waveforms 28–33 as shown in FIG. 2. The PWM-OSC signal 28 is depicted as long time base configuration compared to the I-SENSE signal 31, which is depicted in solid lines with the SET-POINT signal 31A indicated in phantom.

Referring to both FIG. 1 and FIG. 2, the bridge control logic 18, during the REV signal 29 activates the appropriate switches S1–S4 in the H bridge 12 causing REV current to flow in the phase. At PWM_OSC signal edge 28A, of the PWM-OSC signal 28, the bridge control logic 18 switches to the FWD direction. During the MASK signal 30, the END_FWD signal 33 on conductor 27 will not be present. For the duration of the MASK signal 30 at the input to the logic gate 16 switching transients 31B, are prevented from prematurely ending the FWD current. When the MASK signal 30 is absent from the input to logic gate 16, the END_FWD signal 33 can occur in response to the FWD signal 32, on the input to logic gate 16. When the END_FWD signal 33 occurs the bridge control logic 18 stops the FWD current and switches to RECIRC current. The removal and replacement during the MASK signal 30 keeps the current balanced during the commutation transient period. The phase current losses that naturally occur while the H bridge is in RECIRC are accurately replaced when the phase current flows in the FWD direction after the MASK signal 30 ends.

In this arrangement, the FWD current will not be stopped prematurely by switching transients nor be allowed to stay on too long by a simple mask, whereby the "FWD" current will rise to the SET_POINT signal 31A consistently. It is to be noted that the other motor phases can use the same PWM_OSC signal edge 28A or the other PWM_OSC signal edge as indicated at 28B.

What is claimed is:

1. A motor driver circuit comprising:
   an H-switch circuit arranged for connection with one phase of a multi-phase step motor;
   a switch driver interconnected with said H-switch and a bridge control circuit;
   a set point generator connecting with one input to a comparator;
   a phase current sensing resistor connecting with said H-switch and another input to said comparator for providing a sense resistor signal to said H-switch and said comparator; and a pulse width modulation (PWM) oscillator connecting with one input to a logic gate and an output from said comparator connecting another input to said logic gate, an output from said logic gate connecting with said bridge control circuit, whereby direction and duration of current flow to said H-switch via said bridge control circuit and said switch driver is controlled by operation of said PWM oscillator and said PWM oscillator blocks output of said logic gate for a period spanning one edge of a PWM oscillator signal from said bridge control circuit.

2. A method for modifying current flow thru one phase of a multi-phase step motor comprising the steps of:
   sensing phase current flow thru one phase of the multi-phase step motor;
   comparing said phase current flow to a set point value; preventing interruption of said phase current flow during occurrence of a mask signal; and
   interrupting said phase current flow after cessation of said mask signal and said phase current flow compares to said set point value.

3. The method of claim 2 including the steps of:
   starting said phase current flow in a first direction upon occurrence of an edge of a reverse signal;
   determining an edge of a pulse width modulation (PWM) oscillator signal, said (PWM) oscillator signal defining said phase current flow; and
   continuing said phase current flow upon occurrence of a falling edge of said (PWM) oscillator signal when said phase current flow increases to said set point value.

* * * * *